United States Patent [19]

Ishii et al.

[11] Patent Number: 4,722,804

[45] Date of Patent: * Feb. 2, 1988

[54] LIQUID CRYSTAL COMPOSITION

[75] Inventors: Yutaka Ishii, Nara; Fumiaki Funada, Yamatokoriyama; Masataka Matsuura, Tenri, all of Japan

[73] Assignees: Sharp Kabushiki Kaisha, Osaka, Japan; Merck Patent Gesellschaft mit beschrankter Haftung, Fed. Rep. of Germany

[ * ] Notice: The portion of the term of this patent subsequent to Feb. 17, 2004 has been disclaimed.

[21] Appl. No.: 834,357

[22] Filed: Feb. 28, 1986

Related U.S. Application Data

[63] Continuation of Ser. No. 614,013, May 25, 1984, abandoned.

[30] Foreign Application Priority Data

May 26, 1983 [JP] Japan .................................. 58-93812

[51] Int. Cl.$^4$ .......................... G02F 1/13; C09K 19/34
[52] U.S. Cl. ............................ 252/299.61; 252/299.5; 252/299.63; 252/299.66
[58] Field of Search .......... 252/299.61, 299.5, 299.63, 252/299.66; 350/350 R

[56] References Cited

U.S. PATENT DOCUMENTS

| 3,947,375 | 3/1971 | Gray et al. | 252/299.67 |
| 4,137,192 | 1/1979 | Matsufuji et al. | 252/299.63 |
| 4,180,475 | 12/1979 | Schadt et al. | 252/299.5 |
| 4,372,871 | 2/1983 | Toriyama et al. | 252/299.63 |
| 4,391,730 | 7/1983 | Kuschel et al. | 252/299.61 |
| 4,564,694 | 1/1986 | Hirai et al. | 252/299.63 |
| 4,643,841 | 2/1987 | Ishii et al. | 252/299.61 |

FOREIGN PATENT DOCUMENTS

| 137210 | 4/1985 | European Pat. Off. | 252/299.61 |
| 2257588 | 6/1973 | Fed. Rep. of Germany | 252/299.61 |
| 54-43189 | 4/1979 | Japan | 252/299.61 |
| 54-41285 | 4/1979 | Japan | 252/299.61 |
| 55-152777 | 11/1980 | Japan | 252/299.61 |
| 59-221377 | 12/1984 | Japan | 252/299.61 |
| 60-184587 | 9/1985 | Japan | 252/299.61 |
| 2067586 | 7/1981 | United Kingdom | 252/299.61 |

Primary Examiner—Teddy S. Gron
Attorney, Agent, or Firm—Birch, Stewart, Kolasch & Birch

[57] ABSTRACT

A liquid crystal composition having a positive dielectric anisotropy in the nematic phase, comprising of each 3 wt % or more of 2-(4-alkoxyphenyl)-5-alkylpyrimidine compound and of a cyanobiphenyl compound.

6 Claims, 3 Drawing Figures

LIQUID CRYSTAL COMPOSITION

This application is a continuation of copending application Ser. No. 614,013, filed on May 25, 1984, now abandoned.

BACKGROUND OF THE INVENTION

1. Field of the Invention

The present invention relates to a liquid crystal composition, and more particularly to a liquid crystal composition suitable for liquid crystal display devices of the twisted nematic mode in which the multiplex drive scheme is employed.

2. Description of the Prior Art

Recently, the enlargement of the information content of display a device is needed in the field of liquid crystal display devices. Liquid crystal display devices of the matrix display type are being supplied more and more because they are more appropriate for the enlargement of the information content than liquid crystal display devices of the segment display scheme which have previously been used. The increase in the number N of multiplexed lines of the multiplex drive in the matrix display scheme is also demanded in order to develop the diversification of display further.

A matrix display is usually driven with the optimized amplitude selecting method. Then, liquid crystal materials applicable to liquid crystal display devices of the matrix display type with large display capacity should have sharp threshold characteristics or good contrast characteristics for a small voltage difference near the threshold voltage. This can easily be understood as for liquid crystal display panels of the X-Y matrix display as follows. If they are driven with the optimized amplitude selecting method, the ratio of the effective voltage $V_{rms}$(on) in the selected elements to the effective voltage $V_{rms}$(off) in the unselected elements is expressed in the following equation:

$$\alpha = \frac{V_{rms}(on)}{V_{rms}(off)} = \sqrt{\frac{\sqrt{N}+1}{\sqrt{N}-1}}.$$

It is apparent in this equation that $\alpha$ decreases to 1 when N is increased up to infinity. In other words, the difference between $V_{rms}$(on) and $V_{rms}$(off) decreases with an increase in N. The contrast of the liquid crystal display also depends on the angle at which a man views the display, and the viewing angle dependence of the threshold characteristics should be weak for the display device with a wide viewing angle. Accordingly, liquid crystal materials suitable for large display capacity should show sharp contrast for the small difference in the effective applied voltage or should have sharp threshold characteristics against the effective applied voltage.

However, prior art liquid crystal materials do not have threshold characteristics good enough for matrix drive with a relatively large N, and this causes troubles such as the lowering of the display contrast and the narrowing of the effective viewing angle.

SUMMARY OF THE INVENTION

An object of the present invention is to provide a new liquid crystal composition appropriate for the multiplex drive scheme especially with a high number of multiplexed lines.

In accordance with the present invention, a new liquid crystal composition is provided which has a positive dielectric anisotropy in the nematic phase, comprising of each 3 wt% or more of a 2-(4-alkoxyphenyl)-5-alkylpyrimidine compound and of a cyanobiphenyl compound.

Other objects and features of the invention may be understood from the following detailed description of an illustrative embodiment of the invention, taken together with the accompanying drawings, in which.

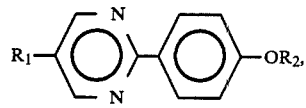

DETAILED DESCRIPTION OF THE INVENTION

As is well known, in order to produce sharp threshold characteristics in liquid crystal display devices in the twisted nematic mode, a liquid crystal composition should desirably be composed of materials which have the elastic constant ratio $K_{33}/K_{11}$ as small as possible where $K_{11}$ is the splay elastic constant and $K_{33}$ the bend elastic constant. From this point of view, we direct our attention to 2-(4-alkoxyphenyl)-5-alkylpyrimidine,

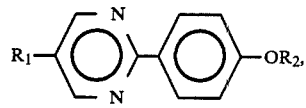

where $R_1 = C_nH_{2n+1}$, $R_2 = C_mH_{2m+1}$, and n and m are positive integers. The ratios $K_{33}/K_{11}$ of those materials are about 0.6 much smaller than that of the materials used in the conventional liquid crystals such as the phenylcyclohexane liquid crystals, biphenyl liquid crystals, cyanopyrimidine liquid crystals, dioxane liquid crystals, ester liquid crystals, etc. The ratios of the materials of the conventional liquid crystals usually fall in the range between 0.9 and 2.0.

Table 1 shows electro-optical characteristics of a pyrimidine mixed liquid crystal (hereinafter referred to as Composition 1 or Comp. 1) whose main component is 2-(4-alkoxyphenyl)-5-alkylpyrimidine

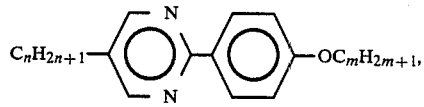

where n=4 and m=2 or 4, or n=6 and m=2, 4 or 6. The counterparts of some commercial liquid crystal materials for matrix drive are also shown in Table 1. Among them, ZLI-1701(Merck) comprises mainly a phenylcyclohexane liquid crystal, E-90 (BDH) ester liquid crystal, and ROTN-403 (Rosche) a biphenyl liquid crystal and a cyanopyrimidine liquid crystal.

TABLE 1

|  | Comp. 1 | ZLI-1701 | E-90 | ROTN-403 |
|---|---|---|---|---|
| $V_{90\%}^{0°}$ (V) | 6.9 | 1.78 | 1.32 | 1.43 |
| $a^{0°}$ | 1.36 | 1.42 | 1.39 | 1.42 |
| $a^{15°}$ | 1.23 | 1.33 | 1.28 | 1.28 |
| $a^{30°}$ | 1.16 | 1.27 | 1.23 | 1.21 |
| $a^{45°}$ | 1.12 | 1.24 | 1.20 | 1.18 |
| $\gamma_{45°,90\%}^{15°,50\%}$ | 1.22 | 1.33 | 1.36 | 1.40 |

Figure 1A:
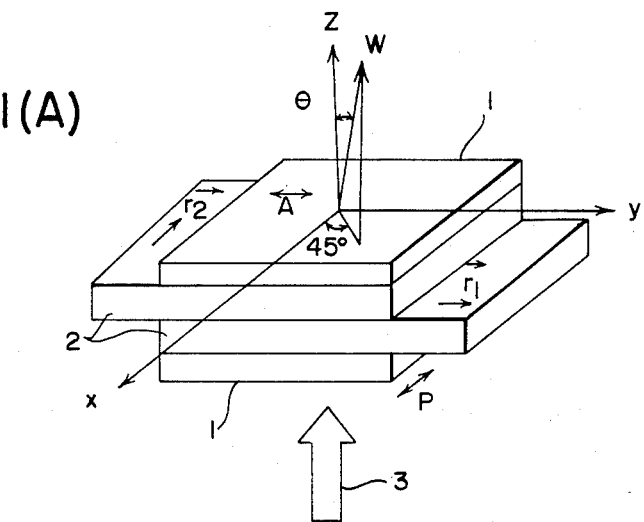
FIG. 1(A) illustrates the construction of a liquid crystal display cell and defines the viewing angle $\theta$ of the measuring direction W.

FIG. 1(A) displays schematically the structure of a liquid crystal cell and the direction of the measurement of the electro-optical characteristics. A liquid crystal cell 2 contains liquid crystal material, and $\vec{r}_1$ and $\vec{r}_2$ shows the directions of the rubbing on the cell substrate surfaces. Polarisers 1 are attached to the liquid crystal cell, and $\vec{P}$ and $\vec{A}$ are the directions of the polarization axis of the polarizers 1. In FIG. 1(A), z axis is defined to be perpendicular to the liquid crystal cell 2, while y axis to lie along the longitudinal direction of the liquid crystal cell and x axis to be perpendicular to y and z axes. The incident light 3 enters perpendicularly in the liquid crystal cell where the voltage V is applied between the liquid crystal material. The direction W along which the transmission of light is measured is changed in a plane which lies in the measuring angle $\theta$ which is defined as an angle between z axis and W.

Figure 1B:
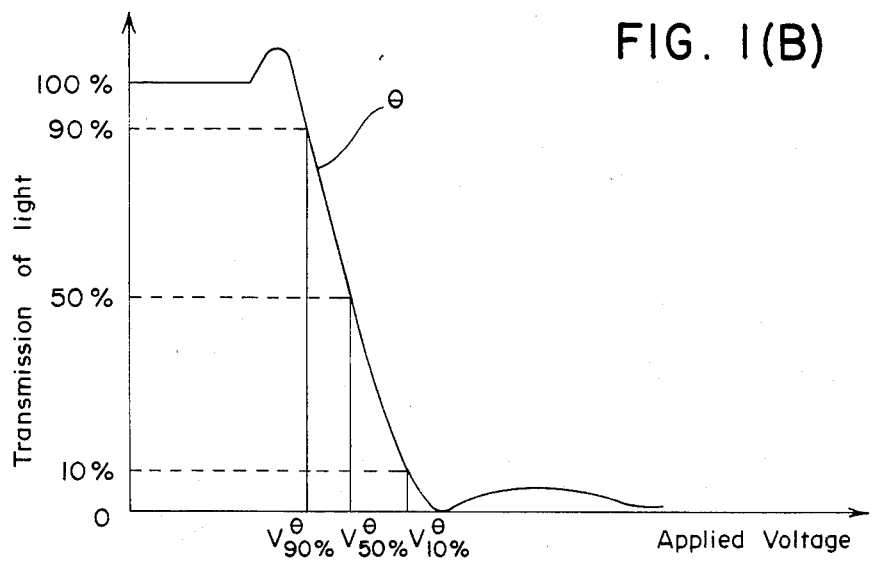
FIG. 1(B) is a graph of the transmission of light plotted against the applied voltage.

FIG. 1(B) shows the transmission plotted against the applied voltage at constant $\theta$. $V\alpha^\theta$ denotes the applied voltage at which the transmission is measured at the measuring angle $\theta$. The factor $\alpha^\theta$ ($\theta=0°, 15°, 30°$ or $45°$) is defined as the ratio $V_{10\%}^\theta/V_{90\%}^\theta$, while $$\gamma_{45°,90\%}^{15°,50\%}$$

as the ratio $$V_{10\%}^{15°}/V_{90\%}^{45°}.$$

$\alpha^\theta$ and $$\gamma_{45°,90\%}^{15°,50\%}$$

are an evaluation factor of the contrast characteristics and of the viewing angle characteristics, respectively. As is known to those skilled in the art, it is better that both are smaller together. From this standpoint, Composition 1 is much more superior in the contrast characteristics and the viewing angle characteristics to the other commercial liquid crystals, as shown in Table 1, and is appreciated to be suitable as a component of liquid crystal material for matrix display.

TABLE 2

| No. | | $\Delta\epsilon$ |
|---|---|---|
| No. 1 | $C_3H_7$—⌬—COO—⌬—CN <br> $C_5H_{11}$—⌬—COO—⌬—CN | 27 |
| No. 2 | $C_3H_7$—H—⌬—CN <br> $C_5H_{11}$—H—⌬—CN | 15 |
| No. 3 | $C_3H_7$—(O,O dioxane)—⌬—CN <br> $C_5H_{11}$—(O,O dioxane)—⌬—CN | 19 |
| No. 4 | $C_3H_7$—H—COO—⌬—CN <br> $C_5H_{11}$—H—COO—⌬—CN | 21 |
| No. 5 | $C_3H_7$—⌬—⌬—CN <br> $C_5H_{11}$—⌬—⌬—CN | 16 |

However, the threshold voltage $V_{90\%}^{0°}$ of Composition 1 is higher than those of the conventional liquid crystals, as is shown apparently in Table 1, because its dielectric anisotropy $\Delta\epsilon$ ($\approx 1.0$) is small, where $\Delta\epsilon = \epsilon\|-\epsilon\bot$, and $\epsilon\bot$ is the dielectric constant measured in the direction parallel and perpendicular to the longitudinal axis of the liquid crystal molecule, respectively. The threshold voltage $V_{90\%}^{0°}$ of Composition 1 should be lowered substantially in order for Composition 1 to be used practically as a liquid crystal material. Accordingly, it is necessary for Composition 1 to be mixed with liquid crystal compounds having a positive large $\Delta\epsilon$.

We have tested compounds No. 1 to No. 5 having large dielectric anisotropy $\Delta\epsilon$, as listed in Table 2, which can be mixed effectively with pyrimidine compounds and can make the dielectric anisotropy $\Delta\epsilon$ of the resultant mixed liquid crystal much larger than 0. They are mixtures of weight ratio 1:1 of a compound having a $C_3H_7$ group to that having a $C_5H_{11}$ group. We added 20 wt% of such a mixture to Composition 1, and measured the threshold voltage, the contrast characteristics and viewing angle characteristics of the resultant mixed liquid crystals.

Figure 2:
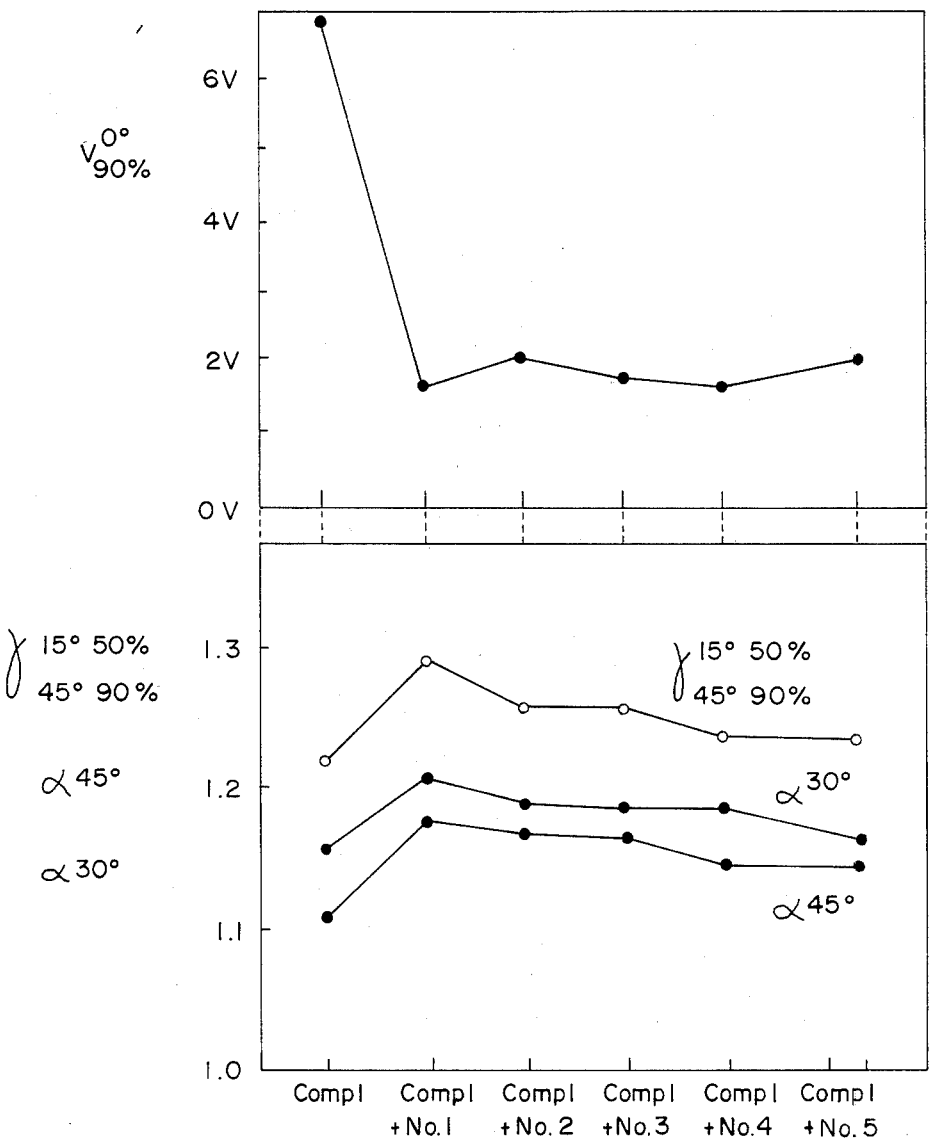
FIG. 2 is a graph which shows the effect of the addition of liquid crystals with the dielectric anisotropy $\Delta\epsilon > 0$ on the electro-optical characteristics such as $V_{90\%}{}^{0°}$ (V), $\alpha^\theta$.

As is found apparently from the data shown in FIG. 2, the threshold voltage $V_{90\%}^{0°}$ of the mixed liquid crystals lowers down below 3 V with the addition of mixtures No. 1 to No. 5. The contrast characteristics ($\alpha^{30°}, \alpha^{45°}$) is good in the order of No. 1<No. 2≃No. 3≦No. 4≦No. 5, while the viewing angle characteristics $$(\gamma^{15°,50\%}_{45°,90\%})$$

in the order of No. 1<No. 2≃No. 3<No. 4≃No. 5, where the quality is expressed by using inequalities and equalities. We have also tested following cyanobiphenyl compounds as compounds to be mixed with Composition 1:

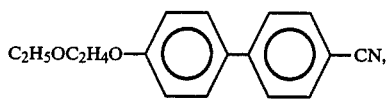

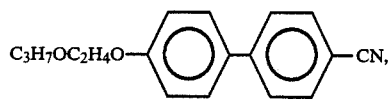

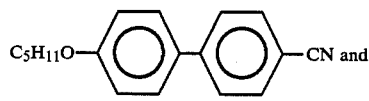

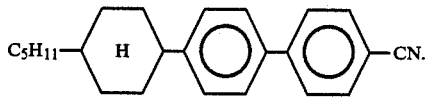

Those compounds are found to show good characteristics similar to the mixture No. 5 when mixed with Composition 1. In conclusion, cyanobiphenyl compounds are apparently very effective as a component to be mixed with a pyrimidine liquid crystal in order to lower the threshold voltage. Then, a basic composition according to the present invention comprises of a 2-(4-alkoxyphenyl)-5-alkylpyrimidine and a cyanobiphenyl compound.

Mixed liquid crystal compositions to be used practically in liquid crystal display devices can be prepared by mixing a basic composition mentioned above appropriately with phenylcyclohexane compounds or dioxane compounds. They have display characteristics much superior to prior ones, while the threshold voltage is low enough for practical use. The mesomorphic range where they may exist in the liquid crystal state is wide enough for practical use. However, it is to be noted that the amount of a pyrimidine compound and of a cyanobiphenyl compound to be added to Composition 1 should be each 3 wt% or more because otherwise the effect of the addition cannot be observed at all.

EMBODIMENTS

An embodiment of the liquid crystal composition of the present invention which comprises basically the above mentioned components is shown in Table 3. Its electrooptical properties measured with the cell thickness about 5.5 μm at room temperature are compiled in Table 4 as well as that of ZLI 1701 for comparison.

As is shown in Table 4, both the contrast and viewing angle characteristics ($\alpha$ values and $\gamma$ value) have been improved remarkably when compared with the counterparts of the commercial ZLI-1701. The value of the threshold voltage is low and both the response time and the delay time are short enough to be used practically.

TABLE 3

| No. | Components | wt % |
|---|---|---|
| I | C$_6$H$_{13}$—[pyrimidine]—[phenyl]—OC$_6$H$_{13}$ | 5.0 |
|  | C$_4$H$_9$—[pyrimidine]—[phenyl]—OC$_7$H$_{15}$ | 5.0 |
| II | C$_3$H$_7$—[phenyl]—[phenyl]—CN | 11.7 |
|  | C$_4$H$_9$—[phenyl]—[phenyl]—CN | 9.0 |
| III | C$_3$H$_7$—[H]—COO—[phenyl]—OC$_2$H$_5$ | 13.5 |
|  | C$_5$H$_{11}$—[H]—COO—[phenyl]—C$_5$H$_{11}$ | 13.5 |

TABLE 3-continued

| No. | Components | wt % |
|---|---|---|
| IV | 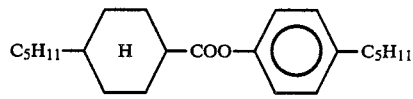 C₃H₇—H—◯—C₂H₅ | 13.5 |
| V | 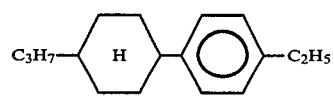 C₅H₁₁—H—◯—◯—C₂H₅ | 9.0 |
| VI | 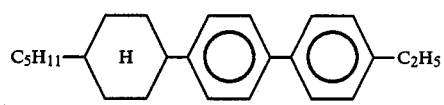 C₅H₁₁—H—◯—◯—H—C₃H₇ | 13.5 |
| VII | 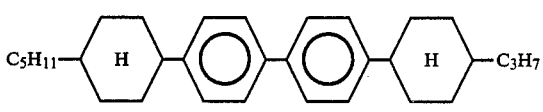 C₄H₉—H—◯—COO—◯—C₃H₇ | 6.3 |

TABLE 4

|  | Invention | Prior Art (ZLI-1701) |
|---|---|---|
| $V^{0°}_{90\%}$ | 2.60 V | 1.78 V |
| $\alpha^{0°}_0$ | 1.41 | 1.42 |
| $\alpha^{15°}$ | 1.27 | 1.33 |
| $\alpha^{30°}$ | 1.20 | 1.27 |
| $\alpha^{45°}$ | 1.16 | 1.24 |
| $\gamma^{15°,50\%}_{45°,90\%}$ | 1.23 | 1.33 |
| $\tau r^*$ | 9.4 msec | 6.4 msec |
| $\tau d^{**}$ | 25 msec | 20 msec |

*τr: response time when the applied voltage rises from 0 to 4 × $V^{0°}_{90\%}$.
**τd: delay time when the applied voltage 4 × $V^{0°}_{90\%}$ is taken off.

The invention may be embodied in other specific forms without departing from the spirit or essential characteristics thereof. The present embodiment is therefore to be considered in all respects as illustrative and not limitative, the scope of the invention being indicated by the appended claims rather than by the foregoing description, and all changes which come within the meaning and range of equivalency of the claims are therefore intended to be embraced therein.

Liquid crystal compositions according to the present invention are very superior in display characteristics as described above in detail. Thus, they can be adapted well to the increase in the display capacity of devices such as display devices and graphic display devices. Especially, they can be applied to liquid crystal televisions where the effectiveness of half-tone display can be fully exploited.

What is claimed is:

1. A liquid crystal composition having a positive dielectric anisotropy in the nematic phase, comprising at least 3 wt% of a 2-(4-alkoxy phenyl)-5-alkylpyrimidine compound, at least 3 wt% of a para cyanobiphenyl compound, and each of the following compounds:

(a) 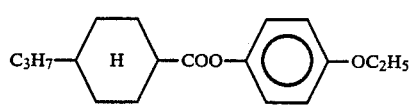 C₃H₇—H—COO—◯—OC₂H₅

(b) C₅H₁₁—H—COO—◯—C₅H₁₁

(c) C₃H₇—H—◯—C₂H₅

(d) C₅H₁₁—H—◯—◯—C₂H₅

(e) C₅H₁₁—H—◯—◯—H—C₃H₇

(f) C₄H₉—H—◯—COO—◯—C₃H₇.

2. A liquid crystal composition according to claim 1, wherein said 2-(4-alkoxyphenyl)-5-alkylpyrimidine compound is represented by

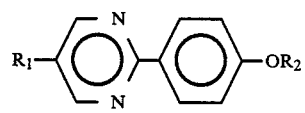

wherein $R_1=C_nH_{2n+1}$ (n=1~12) and $R_2=C_nH_{2n+1}$ (n=1~12).

3. A liquid crystal composition according to claim 1, wherein said para cyanobiphenyl compound is a member selected from the group consisting of:
a 4-alkyl-4'-cyanobiphenyl,

wherein $R_3 = C_nH_{2n+1}$ (n=1~9),
a 4-alkoxy-4'-cyanobiphenyl,

wherein $R_4 = C_mH_{2m+1}$ (m=1~7),
a 4-alkoxy-ethyleneoxy-4'-cyanobiphenyl,

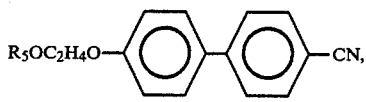

wherein $R_5 = C_nH_{2n+1}$ (n=1~5),
and a 4-cyano-4'(4-alkyl)-cyclohexylbiphenyl,

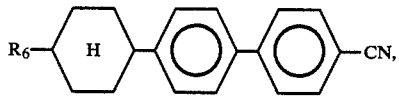

wherein $R_6 = C_nH_{2n+1}$ (n=1~7).

4. A liquid crystal composition according to claim 1, wherein said 2-(4-alkoxyphenyl)-5-alkylpyrimidine compound is present in amount of 10 wt.%, said para cyanobiphenyl is present in an amount of 20.7 wt.%, each of said compound (a), compound (b), compound (c), and compound (e) is present in an amount of 13.5 wt.%, said compound (d) is present in an amount of 9.0 wt.%, and said compound (f) is present in an amount of 6.3 wt. %.

5. A liquid crystal composition according to claim 4, which includes each of the following para cyanobiphenyl and 2-(4-alkoxyphenyl)-5-alkylpyrimidine compounds:

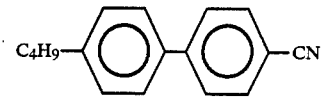

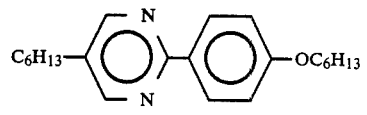

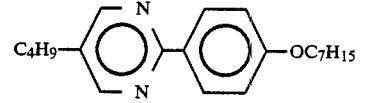

6. A liquid crystal composition according to claim 5, which includes each of the following para cyanobiphenyl and 2-(4-alkoxyphenyl)-5-alkylpyrimidine compounds present in the corresponding wt.%:

|  | wt. % |
|---|---|
| $C_3H_7$—⬡—⬡—CN | 11.7 |
| $C_4H_9$—⬡—⬡—CN | 9.0 |
| $C_6H_{13}$—[pyrimidine]—⬡—$OC_6H_{13}$ | 5.0 |
| $C_4H_9$—[pyrimidine]—⬡—$OC_7H_{15}$ | 5.0 |

* * * * *